United States Patent [19]
Zander et al.

[11] Patent Number: 5,317,355
[45] Date of Patent: May 31, 1994

[54] FILM CASSETTE WITH SPOOL LOCK AND LIGHT-SHIELDING DOOR

[75] Inventors: Dennis R. Zander, Penfield, N.Y.; Hideaki Kataoka, Odawara, Japan

[73] Assignees: Eastman Kodak Company, Rochester, N.Y.; Fuji Photo Film Co., Ltd., Tokyo, Japan

[21] Appl. No.: 34,978

[22] Filed: Mar. 22, 1993

[51] Int. Cl.$^5$ .................................................. G03B 17/26
[52] U.S. Cl. ...................................... 354/277; 242/71.1
[58] Field of Search ............... 354/275, 276, 277, 281; 242/71, 71.1

[56] References Cited

U.S. PATENT DOCUMENTS

| | | | |
|---|---|---|---|
| 2,731,894 | 1/1956 | Leitz et al. | 354/275 |
| 4,221,479 | 9/1980 | Harvey | 354/275 |
| 4,225,034 | 3/1980 | Harvey et al. | 354/121 |
| 4,938,429 | 7/1990 | Robertson et al. | 242/71.1 |
| 4,962,401 | 10/1990 | Takahashi | 354/275 |
| 5,030,978 | 7/1991 | Stoneham et al. | 354/21 |
| 5,049,912 | 9/1991 | Pagano et al. | 354/275 |
| 5,115,268 | 5/1992 | Kitagawa et al. | 354/275 |
| 5,200,777 | 4/1993 | Zander | 354/275 |

FOREIGN PATENT DOCUMENTS

| | | | |
|---|---|---|---|
| 0414269A2 | 2/1991 | European Pat. Off. | G03B 17/30 |
| 0436767A2 | 7/1991 | European Pat. Off. | G03B 17/30 |
| 2-64533 | 3/1990 | Japan | G03B 17/30 |
| 3-75637 | 3/1991 | Japan | G03C 3/00 |

*Primary Examiner*—Michael L. Gellner
*Assistant Examiner*—Howard B. Blankenship
*Attorney, Agent, or Firm*—Roger A. Fields

[57] ABSTRACT

A film cassette comprises a light-shielding door for preventing ambient light from entering the cassette interior, a film spool supported for rotation in film unwinding and film winding directions, and a locking device supported for movement into engagement with the spool to secure the spool and out of engagement with the spool to release the spool. According to the invention, the door is supported for closing movement to prevent ambient light from entering the cassette interior and for opening movement, and includes a cam for moving the locking device into engagement with the spool responsive to closing movement of the door. Also, the locking device is resilient to permit it to be temporarily deformed should it be obstructed from being moved by the cam to engage the spool and the light-shielding door is forcibly closed, or should it be engaging the spool and the spool is forcibly rotated in the film unwinding and winding directions.

6 Claims, 3 Drawing Sheets

FILM CASSETTE WITH SPOOL LOCK AND LIGHT-SHIELDING DOOR

CROSS-REFERENCE TO RELATED APPLICATIONS

Reference is made to commonly assigned copending applications Ser. No. 07/787356, U.S. Pat. No. 5,200,777, entitled FILM CASSETTE WITH INTEGRATED CASSETTE ELEMENT LOCK AND LIGHT BLOCKING DEVICE and filed Nov. 4, 1991 in the name of Dennis R. Zander, and Ser. No. 08/036,020, entitled FILM CASSETTE WITH SPOOL LOCK AND LIGHTSHIELDING DOOR and filed Mar. 22, 1993 in the names of Dennis R. Zander and Eugene Sisto.

BACKGROUND OF THE INVENTION

1. Field of the Invention

The invention relates generally to the field of photography, and in particular to a film cassette containing a film spool about which a filmstrip is coiled. More specifically, the invention relates to a film cassette having a spool lock for preventing rotation of the film spool and a light-shielding door that can be opened to permit film movement out of and back into the cassette interior.

2. Description of the Prior Art

U.S. Pat. No. 5,115,268 issued May 19, 1992 discloses a film cassette comprising a light-trapping plush for preventing ambient light from entering the cassette interior through a film egress/ingress passageway, a film spool supported for rotation in film unwinding and film winding directions, and a locking pawl supported for movement into engagement with the spool to secure the spool and out of engagement with the spool to release the spool. The spool has a coaxial ratchet wheel with assymmetrically shaped teeth. The locking pawl appears to be a rigid beam member which is pivotally mounted at one end and has an assymmetrically shaped detent portion at an opposite end. A curved spring arm portion of the locking pawl extends from the end of the rigid beam member that has the detent portion, to bias the detent portion to between any two adjacent ones of the teeth in order to secure the spool. To remove the detent portion from between the two adjacent teeth, an engagement release portion of the locking pawl is turned to pivot the rigid beam member against the contrary urging of the spring arm portion. The engagement release portion then is held in the turned-to position to maintain the detent portion separated from the ratchet wheel. When the engagement release portion is released, the spring arm portion is free to pivot the rigid beam member to return the detent portion to between any two adjacent ones of the teeth in order to re-secure the spool.

PROBLEMS TO BE SOLVED BY THE INVENTION

Since in U.S. Pat. No. 5,115,268 the beam member of the locking means is apparently rigid, and the teeth of the ratchet wheel and the detent portion of the beam member are assymmetrically shaped, an attempt to forcibly rotate the spool in a film unwinding direction will most likely fracture the beam member.

Also, in the '268 patent the film cassette is of the type that is capable of advancing a non-protruding film leader outwardly from the cassette interior when the film spool is rotated in the unwinding direction. However, it is possible that the leading end of the film leader will stub against the light-trapping plush, in which instance the film leader cannot be advanced out of the cassette interior. Moreover, should the film leader be moved out of and back into the cassette interior several times, this may cause the plush to lose its effectiveness as a light-trapping means.

SUMMARY OF THE INVENTION

According to the invention, a film cassette comprising light-shielding means for preventing ambient light from entering the cassette interior, a film spool supported for rotation in film unwinding and film winding directions, and locking means supported for pivotal movement into engagement with the spool to secure the spool and out of engagement with the spool to release the spool, is characterized in that:

the light-shielding means is supported for closing movement to prevent ambient light from entering the cassette interior and for opening movement, and includes cam means for pivotally moving the locking means into engagement with the spool responsive to closing movement of the light-shielding means and for holding the locking means engaged with the spool; and the locking means includes first resilient means for being temporarily deformed should the locking means be blocked from being pivotally moved by the cam means to engage the spool and the light-shielding means is forcibly closed or should the locking means be held engaged with the spool and the spool is forcibly rotated in the film unwinding and winding directions, and second resilient means for being temporarily deformed independent of the first resilient means should the locking means be held engaged with the spool and the spool is forcibly rotated in the film unwinding and winding directions, whereby the light-shielding means is permitted to be closed even though the locking means is obstructed and the spool is permitted to be rotated even though the locking means is engaging the spool.

ADVANTAGEOUS EFFECTS OF THE INVENTION

By supporting the light-shielding means for opening movement, it is assured that the leading end of a film leader can be freely advanced outwardly from the cassette interior as compared to possibly stubbing on a light-trapping plush as in U.S. Pat. No. 5,115,268. Moreover, should the film leader be moved out of and back into the cassette interior several times, this will not cause the light-shielding means to lose any effectiveness (when it is closed) to prevent ambient light from entering the cassette interior as in the case of the light-trapping plush.

By including cam means for moving the locking means into engagement with the spool responsive to closing movement of the light-shielding means, it is assured that the spool will be secured at the appropriate time.

By making the locking means capable of being temporarily deformed when the spool is rotated in the film unwinding and winding directions, but the locking means is engaging the spool, it is assured that the locking means will not be fractured and that the light-shielding means will not be compelled to open.

By making the locking means capable of being temporarily deformed when the light-shielding means is closed, but the locking means is obstructed from being moved by the cam means to engage the spool, it is assured that the light-shielding means can be closed.

DETAILED DESCRIPTION OF THE INVENTION

The invention is disclosed as being embodied preferably in a film cassette. Because the features of a film cassette are generally known, the description which follows is directed in particular only to those elements forming part of or cooperating directly with the disclosed embodiment. It is to be understood, however, that other elements may take various forms known to a person of ordinary skill in the art.

Figure 1:
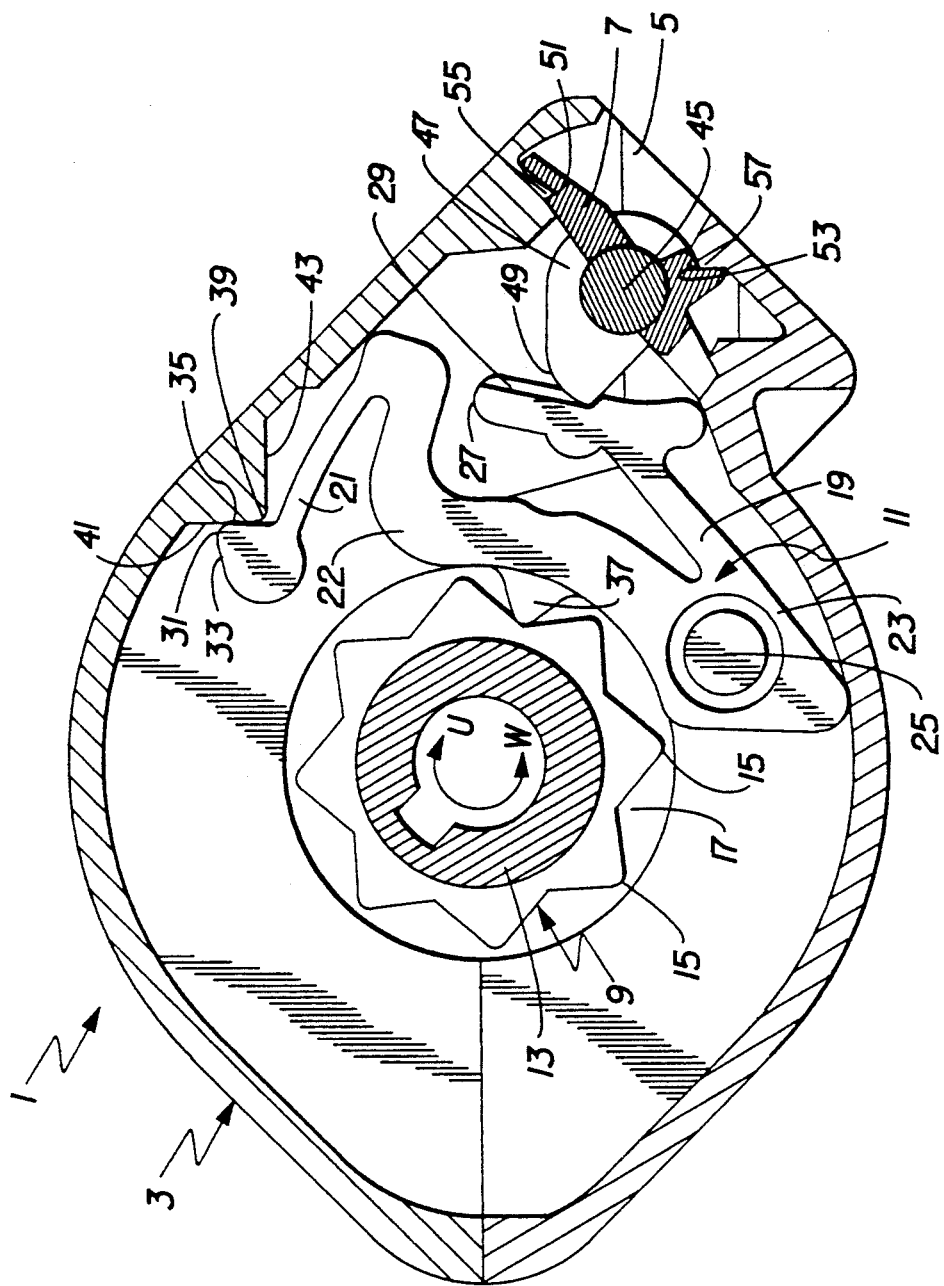
FIG. 1 is a sectional view of a film cassette with a spool lock and a light-shielding door according to a preferred embodiment of the invention, showing the door closed and the spool lock in a locking position.
Figure 2:
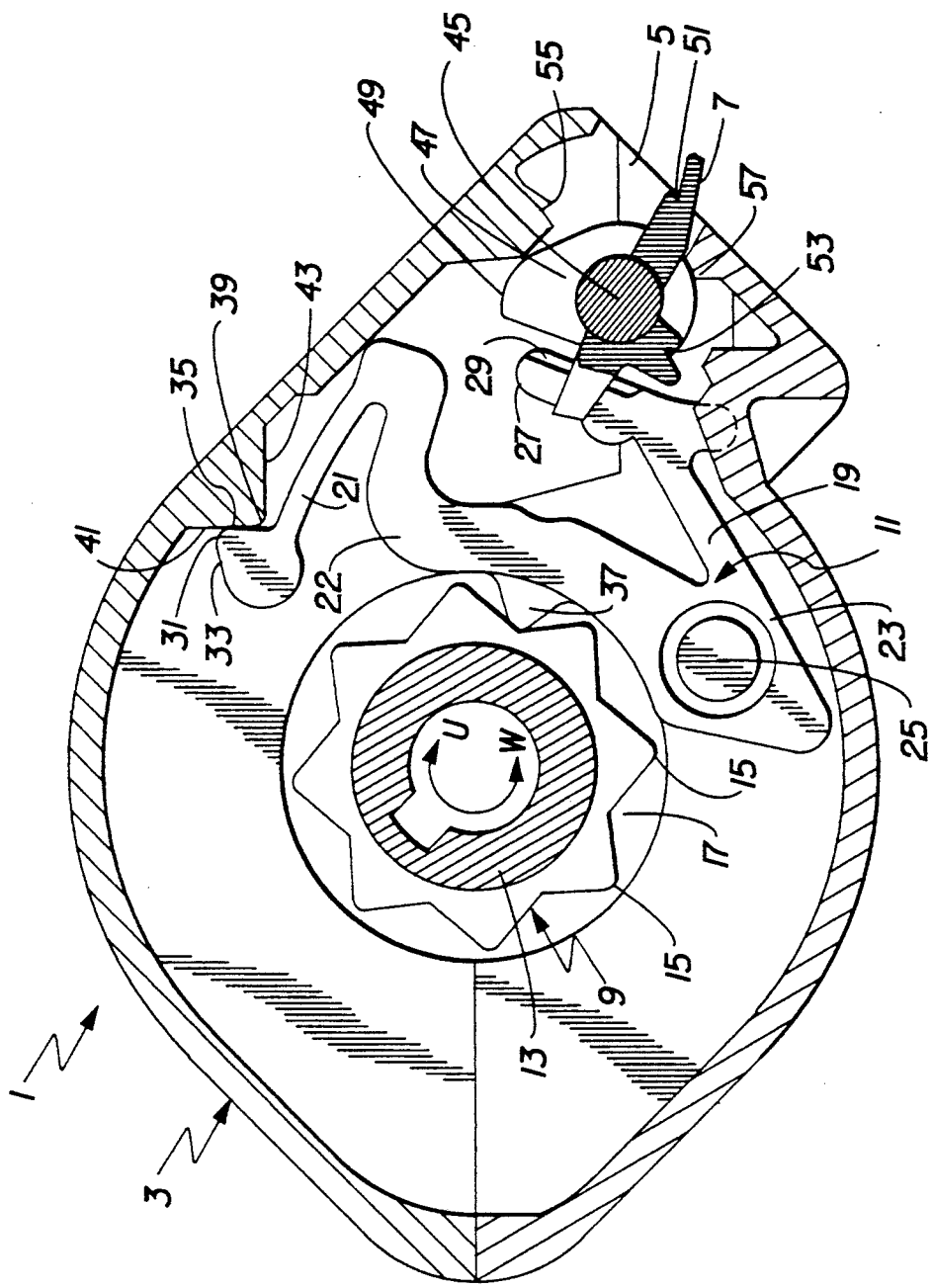
FIG. 2 is a sectional view similar to FIG. 1, showing the door open and the spool lock in its locking position.
Figure 3:
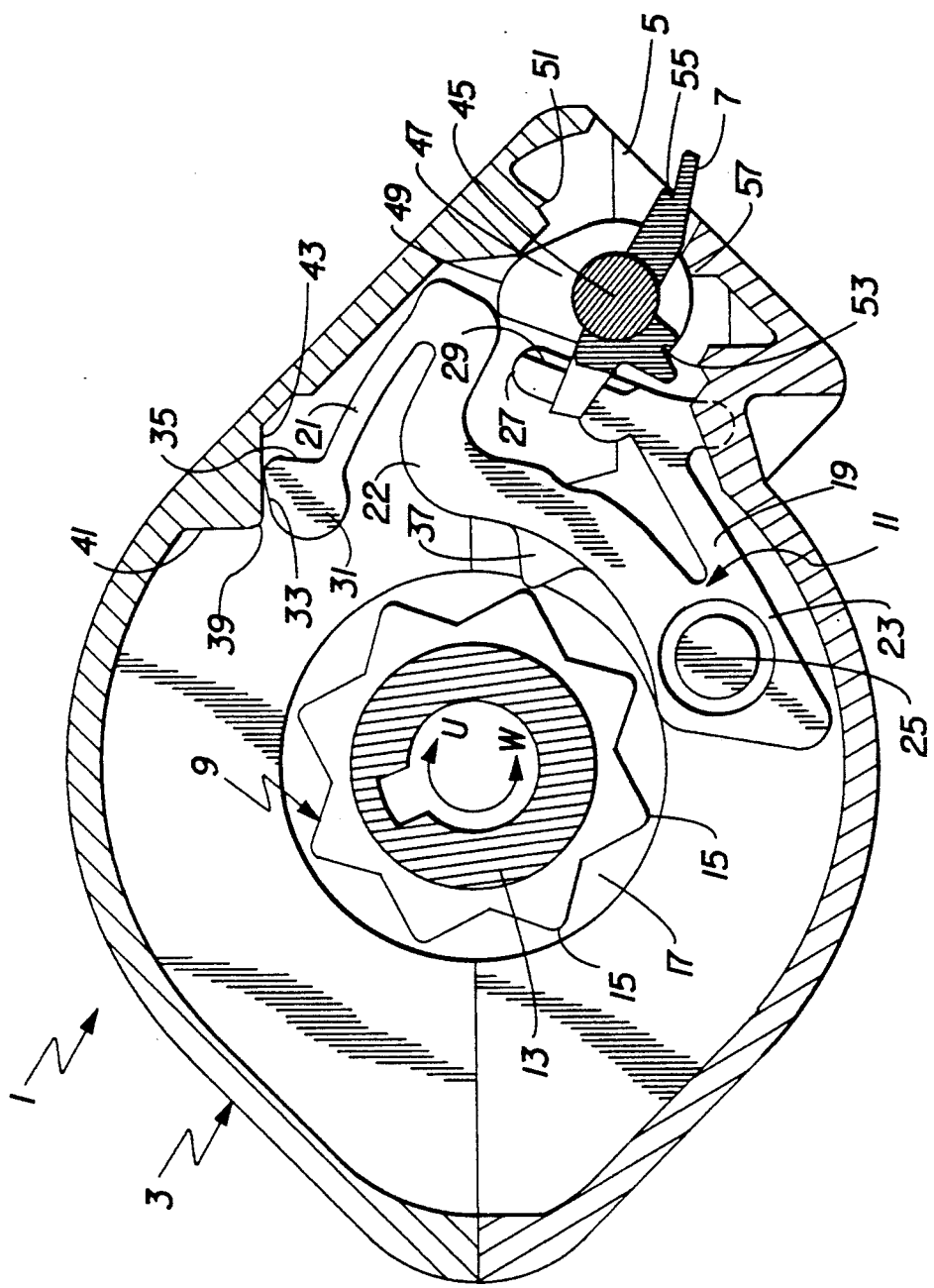
FIG. 3 is a sectional view similar to FIG. 1, showing the door open and the spool lock in a non-locking position.

Referring now to the drawings, FIGS. 1-3 show a film cassette 1 comprising a cassette shell or housing 3 with a film egress/ingress opening 5, a light-shielding door 7 for preventing ambient light from entering the cassette interior through the film egress/ingress opening, a film spool 9 supported for rotation inside the cassette shell in film unwinding and winding directions U and W, and a locking device 11 for securing or arresting the spool to prevent its rotation. Certain aspects of the film cassette 1 are similar to cross-referenced application Ser. No. 07/787356. The cross-referenced application is incorporated in this application.

The film spool 9 has a spool core or hub 13 with a toothed periphery consisting of successive teeth 15 separated by respective interdental spaces 17. The teeth 15 are each identically symmetrically ( not assymmetrically) shaped. See FIG. 1.

The locking device 11 is a single-piece device comprising a first spring arm 19, second spring arm 21 more compliant than the first spring arm, and a relatively stiff support-extension 22 of the second spring arm. The first spring arm 19 and the relatively stiff support-extension 22 of the second spring arm 21 generally converge to a common base 23. The locking device 11 is supported for pivotal movement at the base 23 about an axis pin 25 or a ball-and socket (not shown). Each of the two spring arms 19 and 21 is capable of recovering its size and shape after deformation caused by compressive stress. The first spring arm 19 has a free end 27 and a cam follower surface 29 located between the free end and the base 23. The second spring arm 21 has a free end 31 with two angled sides 33 and 35, and its relatively stiff support-extension 22 has a symmetrically shaped detent portion 37 located between the free end and the base 23.

A restraining protuberance 39 with two angled sides 41 and 43 is fixed to the inside of the cassette shell 3. As shown in FIGS. 1 and 2, the angled side 41 of the restraining protuberance 39 is adapted to captively contact the angled side 35 of the free end 31 of the second spring leg 21 to hold the detent portion 37 of the relatively stiff support-extension 22 in anyone of the interdental spaces 17 between two adjacent ones of the teeth 15. This is done to secure or arrest the spool core 13 substantially to prevent rotation of the film spool 9 in the film unwinding and winding directions U and W. However, as shown in FIG. 3, the film spool 9 can be forcibly rotated in the film unwinding and winding directions U and W to make either one of the two adjacent teeth 15 between which the detent portion 37 is positioned eject the detent portion from the particular space 17 separating those two teeth.

The light-shielding door 7 is supported for closing movement about an axis pin 45 to prevent ambient light from entering the cassette interior through the film egress/ingress opening 5 and for opening movement about the same pin to permit film movement out of and back into the cassette interior. The axis pin 45 for the door 7 extends parallel to the axis pin 25 for the locking device 11. A coaxial cam 47 is integrally formed with the door 7 and has a camming surface 49 for depressing the cam follower surface 29 of the first spring leg 19, when the door is closed, to pivotally move the locking device 11 as can be seen by looking at FIGS. 3 and 1. This normally causes the free end 31 of the second spring leg 21 to hop over the restraining protuberance 39, consequently separating the angled side 33 of the free end from the angled side 43 of the restraining protuberance, and bringing the angled side 35 of the free end into captive contact with the angled side 41 of the restraining protuberance. At the same time, the detent portion 37 of the relatively stiff support-extension 22 will be postioned in anyone of the interdental spaces 17 between two adjacent ones of the teeth 15.

Respective notches 51 and 53 are provided in the light-shielding door 7 for receiving mating projections 55 and 57 fixed to the inside of the cassette shell, when the door is closed as shown in FIG. 1, to releaseably secure the door closed. Pushing the door 7 open overcomes the notch-and-projection engagement. Alternatively, other detent means may be provided.

OPERATION

Beginning with FIGS. 1 and 2, when the light-shielding door 7 is opened, its camming surface 49 is removed from the cam follower surface 29 of the first spring leg 19. However, the second spring leg 21 continues to hold the detent portion 37 of the relatively stiff support-extension 22 in anyone of the interdental spaces 17 between two adjacent ones of the teeth 15 because the angled side 35 of the free end 31 of the second spring leg is in captive contact with the angled side 41 of the restraining protuberance 39. Thus, the locking device 11 remains in place as shown in FIG. 2.

Rotation of the film spool 9 in the unwinding direction U, then, as shown in FIG. 3, causes one of the two teeth 15 between which the detent portion 37 of the relatively stiff support-extension 22 is positioned to eject the detent portion from the particular space 17 separating those two teeth. Concurrently, the free end 31 of the second spring leg 21 hops over the restraining protuberance 39, consequently separating the angled side 35 of the free end from the angled side 41 of the restraining protuberance, and bringing the angled side 33 of the free end into captive contact with the angled side 43 of the restraining protuberance. Thus, the locking device 11 is pivotally moved as can be seen by looking at FIGS. 2 and 3.

If the film spool 9 is rotated in the unwinding direction U, but the door 7 is closed, one of the two adjacent teeth 15 between which the detent portion 37 of the relatively stiff support-extension 22 is positioned will eject the detent portion from the particular space 17 separating those two teeth. (This is possible due to the compliance of the first spring leg 19.) Concurrently, the free end 31 of the second spring leg 21 hops over the restraining protuberance 39, consequently separating the angled side 35 of the free end from the angled side 41 of the restraining protuberance, and bringing the angled side 33 of the free end into captive contact with the angled side 43 of the restraining protuberance. However, the locking device 11 is not free to be pivoted as in FIG. 3, when the door 7 is opened, because the camming surface 49 of the door will continue to bear against the cam follower surface 29 of the first spring leg 19. Then, the resilience of the first spring leg 19 will return the detent portion 37 of the relatively stiff support-extension 22 to the next available space 17 as the film spool 9 is continued to be rotated, and cause the free end 31 of the second spring leg 21 to return over the restraining protuberance 39. As a result, the locking device 11 is not fractured, nor is the door 7 compelled to be opened.

When the door 7 is closed, its camming surface 49 depresses the cam follower surface 29 of the first spring leg 19 to pivotally move the locking device 11 as can be seen by looking at FIGS. 3 and 1. This normally causes the free end 31 of the second spring leg 21 to hop over the restraining protuberance 39, consequently separating the angled side 33 of the free end from the angled side 43 of the restraining protuberance, and bringing the angled side 35 of the free end into captive contact with the angled side 41 of the restraining protuberance. At the same time, the detent portion 37 of the relatively stiff support-extension 22 is positioned in anyone of the spaces 17 between two adjacent ones of the teeth 15.

If the door 7 is closed, but the tip of the detent portion 37 of the relatively stiff support-extension 22 abuts the tip of one of the teeth 15, the free end 31 of the second spring leg 21 cannot hop over the restraining protuberance 39. Thus, the locking device 11 will not be pivoted as in FIG. 1. However, the door 7 can still be forced closed without fracturing the locking device 11 due to the compliance of its first spring leg 19. Then, rotation of the film spool 9 in the winding direction W will allow the detent portion 37 of the relatively stiff support-extension 22 to be received in one of the spaces 17. At the same time, the free end 31 of the second spring leg 21 hops over the restraining protuberance 39, consequently separating the angled side 33 of the free end from the angled side 43 of the restraining protuberance, and bringing the angled side 35 of the free end into captive contact with the angled side 41 of the restraining protuberance. Thus, the locking device 11 will be pivoted as can be seen by looking at FIGS. 3 and 1.

The invention has been described with reference to a preferred embodiment. However, it will be appreciated that variations and modifications can be effected by a person of ordinary skill in the art without departing from the scope of the invention.

Parts List for FIGS. 1-3

1. film cassette
3. cassette shell
5. film egress/ingress opening
7. light-shielding door
9. film spool
11. locking device
13. spool core
15. teeth
17. interdental spaces
19. first spring arm
21. second spring arm
22. relatively stiff support-extension
23. base for spring arms
25. axis pin
27. free end of first spring arm
29. cam follower surface
31. free end of second spring arm
33. angled side of free end 31
35. angled side of free end 31
37. detent portion
39. restraining protuberance
41. angled side of restraining protuberance
43. angled side of restraining protuberance
45. axis pin
47. coaxial cam
49. camming surface
51. notch in door
53. notch in door
55. projection from cassette shell
57. projection from cassette shell
U. film unwinding direction
W. film winding direction

We claim:

1. A film cassette comprising light-shielding means for preventing ambient light from entering the cassette interior, a film spool supported for rotation in film unwinding and film winding directions, and locking means supported for pivotal movement into engagement with said spool to secure the spool and out of engagement with the spool to release the spool, is characterized in that:

said light-shielding means is supported for closing movement to prevent ambient light from entering the cassette interior and for opening movement, and includes cam means for pivotally moving said locking means into engagement with said spool responsive to closing movement of the light-shielding means and for holding the locking means engaged with the spool; and said locking means includes first resilient means for being temporarily deformed should the locking means be blocked from being pivotally moved by said cam means to engage said spool and said light-shielding means is forcibly closed or should the locking means be held engaged with the spool and the spool is forcibly rotated in the film unwinding and winding directions, and second resilient means for being temporarily deformed independent of said first resilient means should the locking means be held engaged with the spool and the spool is forcibly rotated in the film unwinding and winding directions, whereby the light-shielding means is permitted to be closed even though the locking means is obstructed and the spool is permitted to be rotated even though the locking means is engaging the spool.

2. A film cassette as recited in claim 1, wherein said light-shielding means is pivotally mounted for opening and closing movements about a first pivot axis, and said locking means is pivotally mounted for pivotal movement into and out of engagement with said spool about a second pivot axis substantially parallel to said first pivot axis.

3. A film cassette as recited in claim 1, wherein said locking means has a symmetrically shaped detent portion for engaging said spool, and said spool has a toothed periphery with respective successive teeth that are symmetrically shaped to receive said detent portion between any two adjacent ones of said teeth and to eject the detent portion from between those two teeth when said spool is rotated in the film unwinding and film winding directions.

4. A film cassette as recited in claim 3, wherein said detent potion is located along a relatively stiff support-extension of said second resilient means to cause the second resilient means to be temporarily deformed when the detent portion is ejected from between any two adjacent ones of said teeth as said spool is rotated in the film unwinding and winding directions.

5. A film cassette as recited in claim 4, wherein restraining means engages said second resilient means to hold it in place when said detent portion is between any two adjacent ones of said teeth and releases the second resilient means to permit it to be temporarily deformed when the detent portion is ejected from between those two teeth.

6. A film cassette as recited in claim 4, wherein said first resilient means is adapted to be deformed by said cam means when said detent portion is located against any one of said teeth to prevent it from being received between that tooth and an adjacent one of the teeth and said light-shielding means is forcibly closed.

* * * * *